United States Patent [19]

Souza

[11] 4,037,350

[45] July 26, 1977

[54] SAFETY RELEASE FOR ANIMAL TRAP

[75] Inventor: Anthony J. Souza, Lititz, Pa.

[73] Assignee: Woodstream Corporation, Lititz, Pa.

[21] Appl. No.: 666,505

[22] Filed: Mar. 12, 1976

[51] Int. Cl.² .......................................... A01M 23/26
[52] U.S. Cl. ........................................... 43/90; 43/96
[58] Field of Search .................. 43/88, 89, 90, 91, 92, 43/93, 94, 95, 96; 403/261, 233, 191, 192, 241; 248/534

[56] References Cited

U.S. PATENT DOCUMENTS

| 3,802,652 | 4/1974 | Holton, Jr. | 248/534 |
| 3,816,955 | 6/1974 | Conibear | 43/90 |

FOREIGN PATENT DOCUMENTS

| 272,098 | 6/1927 | United Kingdom | 43/88 |

Primary Examiner—John F. Pitrelli
Assistant Examiner—Peter K. Skiff

[57] ABSTRACT

Keeper means for facilitating the removal of an arm of a coil spring actuator from a rotating frame type of animal trap. The keeper is an elongated sleeve one end of which slips over the end of the open ring which is disposed at the terminus of one arm of the coil spring actuator. The other end of the sleeve is slotted on opposite sides in the direction of the longitudinal axis of the sleeve to accommodate the arm of the spring transverse to said axis. Thereby affecting closure of the ring. The engagement between the sleeve and arm is maintained by a cotter pin which passes through the end of the sleeve. The sleeve can be disengaged easily by removing the cotter pin and sliding the sleeve back over the ring thereby opening the ring so that it can be removed from the side of the trap.

5 Claims, 3 Drawing Figures

SAFETY RELEASE FOR ANIMAL TRAP

BACKGROUND OF THE INVENTION

This invention relates to an improvement in rotating frame type animal traps.

More specifically, the present invention relates to an improved keeper on the coil spring actuator of a rotating frame type animal trap.

Rotating frame animal traps are known in the art and are described for example in U.S. Pat. No. 3,010,245 to Conibear. These traps typically comprise a pair of similar frames made of round wire stock, which frames may be of a generally square or rectangular shape, pivotally connected at adjacent ends (end members) for relative rotation on a common axis so as to form by their sides two pairs of co-acting jaws. At least one actuator, consisting of a coil spring having arms terminating in rings slidable along and encircling one set of adjacent ends of the frames, is used to urge the jaws toward and, when the trap is sprung, maintain them in closed position. In U.S. Pat. No. 3,010,245, such a rotating frame trap is described in which the ends which co-operate with the rings are shaped so that in the set position of the trap, these ends lie substantially parallel to each other, while the central portions of these ends near the common axis of the frames form a cross with each other within the rings on the arms of the coil spring. A trigger means (for example as described in above mentioned U.S. patent or in Lehn U.S. Pat. No. 2,947,107), maintains the frames in open position when the trap is set, but when the trap is sprung releases the frames so as to permit, as a result of the action of the spring and rings on the ends, rapid rotation of the frames through an angle of about 90°, so that the jaws quickly strike and kill an animal in the trap.

Because the rings of known traps of this kind completely encircle the end members of the frames, it can be both difficult and dangerous to compress the spring means and set the trap. Moreover, trappers have sometimes experienced difficulties in getting the carcasses of caught animals out of prior traps of this type, when sprung, especially if traps and animals are frozen, because of the great squeezing power of the jaws. For this reason, it has been difficult for a trapper to free, for example, his fingers from the trap if accidentally caught therein. With larger traps, having upper and lower spring means used for animals such as otter, lynx, bobcats, wolverines, and the like, prior traps of this design are sufficiently dangerous and difficult to set or open, that some trappers prefer not to handle them alone on a trap line.

Therefore, the prior art has also suggested that one of the rings located at the terminus of the arms of the coiled actuator spring not be entirely closed but instead be provided with a sufficient opening so that the adjacent ends of the frame, around which the ring is disposed, can, when required, pass, thereby improving the ease and safety with which traps of this type can be set or released. Such a feature is, for example, described in U.S. Pat. No. 3,816,955 which provides for disengagement of the adjacent ends from the ring by swivelling the coil spring around the frames of the trap, when closed, (and therefore rotating the rings around the adjacent ends) in the direction of the opening to a position not normally achieved in either the set or spring condition of the trap, wherein portions of the two adjacent ends can readily pass through the opening so that the ring in question becomes disengaged and all compression on the spring is accordingly released. While the opening in the ring is normally located in a portion of the ring such that passage of the two adjacent ends through the opening while the trap is closing or while the trap is in a set or closed position is unlikely, it is further described that unwanted disengagement of the open ring from the ends of the trap, for example by a struggling animal, can be discouraged by providing a keeper located across the opening in the ring. U.S. Pat. No. 3,816,955 describes such a keeper as being a triangular wire clamp which effects closure of the open ring.

Devices of this type for assuring the closure of the open ring terminating on one arm of the actuating spring have the disadvantage that they are somewhat bulky and unwieldly and do not afford positive closure since they may be shaken loose.

SUMMARY OF THE INVENTION

It is therefore an object of the present invention to provide an improved closure device or keeper for the open ring terminating on one arm of the actuator spring of rotary frame type animal traps.

It is a further object of the present invention to provide a keeper which is compact and easily opened but which at the same time offers a positive and secure closure.

According to the present invention, a tubular sleeve is provided having an inside diameter to accommodate the inserted end of the wire forming the open ring which terminates one of the arms of the coil spring actuator of a rotating frame type trap. The other end of the sleeve is longitudinally slotted on opposite sides of the sleeve so that the wire arm of the spring can be fitted therein transverse to the slot and longitudinal axis of the sleeve. The slots provided at one end of the sleeve are of greater length than the diameter of the wire arm so that a cotter pin passes through the slotted end of the tube effectively prevents the arm from being withdrawn from the slot.

Most advantageously the sleeve of the present invention has the same curvature as the open ring which it closes and must be of sufficient length to connect on one end with the open end of the ring and at the other end to engage the arm of the spring, thereby closing the open ring.

In actual use, the ring can easily be opened by removing the cotter pin and sliding the sleeve back on to the ring so that the ring can then be easily removed from the spring arm.

BRIEF DESCRIPTION OF THE DRAWINGS

These and other features of the present invention will, however, be seen in the following description of the preferred embodiments illustrated in the accompanying Figures in which.

DESCRIPTION OF THE PREFERRED EMBODIMENTS

Figure 1:
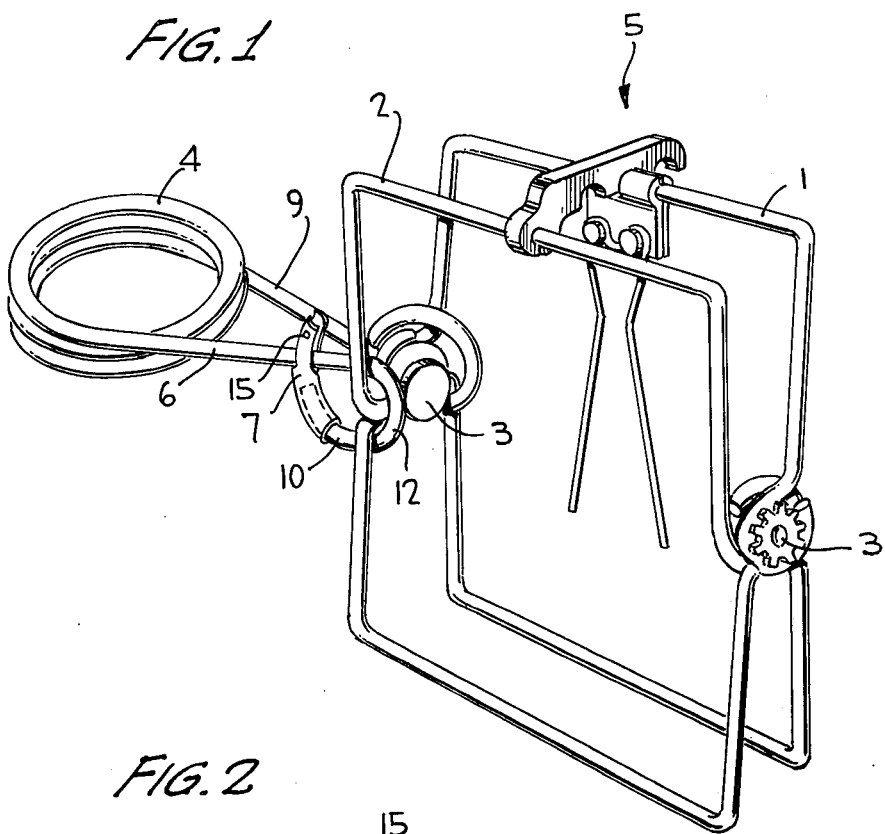
FIG. 1 is a perspective view of a typical rotating frame animal trap showing the open ring terminating one arm of the spring actuator closed by the keeper of the present invention.

Referring to FIG. 1, the device shown comprises frame shaped jaws 1 and 2, each jaw having a pair of opposite frame sides connected by a pair of opposite frame ends. The frame sides of jaw 2 are shorter than those of jaw 1 so that the pair of frame ends of jaw 2 fit within the pair of frame ends of jaw 1. The adjacent frame ends of the respective jaws are pivotally connected by pivots 3 intermediate the frame sides of the respective jaws. The pivots 3 define a pivot axis parallel to the frame sides and normal to the frame ends and about which the frame shaped jaws are pivotable between a sprung position in which the opposite frame sides of jaw 1 are in adjacent relation with the respective frame sides of jaw 2, and a set position in which the respective frame sides of the jaws 1 and 2 are in opposite adjacent relation. The respective frame ends of jaw 1 are bent to oppositely and approximately equally offset the opposite frame sides from a plane passing through the pivot axis and corresponding to the plane of the jaw 1 before its frame ends were bent. The frame ends of jaw 2 are similarly but oppositely bent to adjacently oppose the respective frame sides of jaw 2 to those of jaw 1. The frame sides of jaws 1 and 2 are biased together by a coil spring 4 in the sprung position. The arms 6 and 9 of spring 4 extend tangentially from opposite ends of the coil and are forced toward each other to tension the spring. With the spring partially tensioned, the spring arms, with pivot 3 therebetween, slidably encircle a pair of the pivoted frame ends and are retained partially tensioned on the frame ends by the connected frame sides, thereby biasing the respective frame sides of jaws 1 and 2 together in the sprung position. Pivoting the adjacent sides to the set position in opposite adjacent relation slides the ends of the spring along the frame ends toward the pivot 3 further tensioning the spring to snap said frame sides from the set position back to the sprung position. A typical trigger mechanism is shown at 5 which holds the trap jaws in set position and releases them when sufficient pressure is applied to the trigger. The arm 9 of spring 4 terminates in a closed ring; however, the arm 6 of the spring terminates in an open ring which is closed by the sleeve 7 which fits over the end of arm 6. The other end of the sleeve is slotted to accommodate a portion of the arm 6 above the ring and is closed by a cotter pin or the like 8 (FIG. 3).

Figure 2:
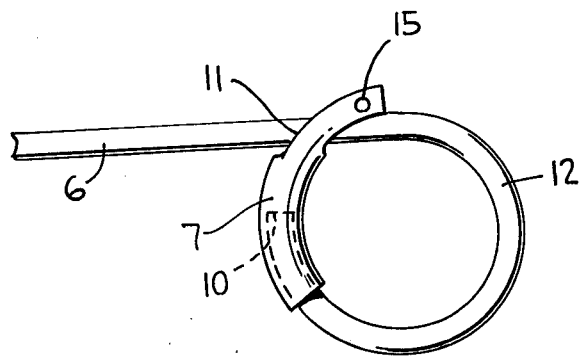
FIG. 2 is a close-up view of the open ring of the spring arm closed by the sleeve keeper of the present invention.

Referring to FIG. 2, a detailed view of sleeve or keeper 7 is shown. The arm 6 of the spring (not shown) forms an open ring or loop 12 which terminates at 10. The tubular sleeve 7 has approximately the same curvature as the ring 12 and fits snugly over the open end of the ring 10. The other end of the sleeve is slotted on opposite sides at 11 to accommodate the arm 6 transversely to the longitudinal axis of the sleeve. The slots in the sleeve extend all the way to the end of the sleeve, but the arm 6 is kept in place by means of a cotter pin 8 or the like (FIG. 3), which passes through openings 15 at both sides of the sleeve.

Figure 3:
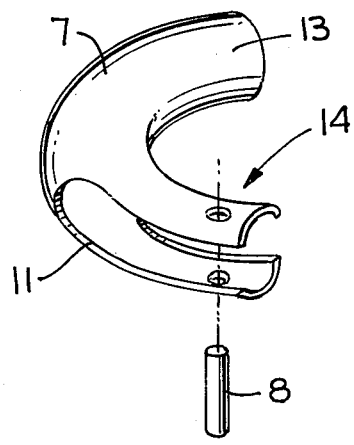
FIG. 3 is a perspective view showing the keeper sleeve in detail.

FIG. 3 shows the keeper sleeve wherein the end of the sleeve 13 which fits over the end of the ring member is of a diameter sufficient to accommodate the end of the ring. The sleeve is further cut away at 14 to illustrate the slots 11 provided to accommodate the arm of the spring at that end of the sleeve. The cotter pin which maintains the sleeve in engagement with the arm is shown at 8.

Trigger mechanism 5 is described in Lehn U.S. Pat. No. 2,947,107 which is embodied herein by reference.

While the keeper sleeve of the present invention effectively prevents the spring actuator on rotating frame traps from becoming dislodged, at the same time the sleeve can quickly and easily be opened by removing the cotter pin and removing the spring arm from the slots in the sleeve. Similarly, the spring arm can be easily and quickly reattached by simply reversing the procedure so that the ring at the end of the spring arm is effectively and securely closed.

While the invention has been described by reference to a single spring on a trap, it is equally application to traps with two springs.

Although the present invention has been described with particularity, it is understood that the present disclosure has been made only by way of example and that numerous changes in the details of construction may be resorted to without departing from the scope and spirit of the present invention as hereinafter claimed.

What is claimed is:

1. A trap comprising two similar frame-shaped jaws, each of said jaws having opposite frame ends, pivot means pivotally connecting said frame ends of one of said jaws to the respective frame ends of the other of said jaws intermediate said frame sides for pivoting said frame-shaped jaws about a common pivot axis between a sprung position in which the opposite frame sides of one jaw are in adjacent relation with the respective frame sides of said other jaw, and a set position in which the respective frame sides of the two jaws are in opposite adjacent relation, spring means comprising a coil spring member with two projecting arms each of which terminates in a ring member which slidably engages around a respective pair of pitvotally connected frame ends for biasing said frame-shaped jaws around said pivot means from said set position to said sprung condition; one of said ring members which terminates a projecting arm of the spring being a closed ring and the other of said ring members being an open ring with its opening being sufficient to permit passage of said frame side there through, the open end of said ring member engaging one end of an elongated tubular sleeve, the other end of which is slotted on opposing sides in a direction longitudinal to the axis of the tubular member to engage transversely the arm of the spring on which said open ring is disposed and locking means at the slotted end of said tubular sleeve to maintain said arm and sleeve in engagement, and a trigger means extending between said frame-shaped jaws for releasing said frames from the set to the sprung position when releasing pressure is applied to said trigger means.

2. The trap of claim 1 in which said tubular sleeve has a curvature along its longitudinal axis which is the same as that of the open ring.

3. The trap of claim 1, wherein said locking means is a cotter pin.

4. Easily releasible safety keeper means for a trap of the rotating frame type having spring means comprising projecting arms, each arm having a terminal ring slidingly engaging the frames of the trap, one of said rings being partially open; said keeper means comprising an elongated tubular sleeve having a curvature approximately equal to that of said ring, one end of said sleeve being slotted on opposing sides in a direction longitudinal to the axis of the sleeve, the other end of said sleeve being engaged by the open end of said partially open ring, said slotted end of said sleeve engaging transversely the arm of said spring, and means to releaseably lock said keeper means to said arm.

5. The easily releaseable safety keeper means of claim 4, wherein said locking means is a cotter pin.

* * * * *